US012006687B2

(12) United States Patent
Lomax et al.

(10) Patent No.: US 12,006,687 B2
(45) Date of Patent: Jun. 11, 2024

(54) REBAR BITER

(71) Applicants: Robert Lomax, The Woodlands, TX (US); Benjamin Joseph Perry, Oakland, NJ (US); Brendan Paul Barry, Asbury, NJ (US)

(72) Inventors: Robert Lomax, The Woodlands, TX (US); Benjamin Joseph Perry, Oakland, NJ (US); Brendan Paul Barry, Asbury, NJ (US)

( * ) Notice: Subject to any disclaimer, the term of this patent is extended or adjusted under 35 U.S.C. 154(b) by 0 days.

(21) Appl. No.: 17/300,970

(22) Filed: Dec. 29, 2021

(65) Prior Publication Data

US 2023/0203812 A1 Jun. 29, 2023

(51) Int. Cl.

| | |
|---|---|
| ***E04C 5/16*** | (2006.01) |
| ***A62B 35/00*** | (2006.01) |
| ***B25B 5/10*** | (2006.01) |
| *E04G 21/32* | (2006.01) |

(52) U.S. Cl.

CPC .......... *E04C 5/167* (2013.01); *A62B 35/0043* (2013.01); *B25B 5/101* (2013.01); *E04G 21/3204* (2013.01)

(58) Field of Classification Search

CPC .. A62B 35/0037–0056; A62B 35/0068; E04G 21/3204; B25B 5/101; B25B 5/082; B25B 5/125; B25B 5/067

See application file for complete search history.

(56) References Cited

U.S. PATENT DOCUMENTS

| | | | | |
|---|---|---|---|---|
| 2,896,896 | A * | 7/1959 | Revzin | B25B 5/101 248/229.15 |
| 4,903,929 | A * | 2/1990 | Hoffman | B25B 5/101 248/229.15 |
| 6,494,411 | B1 * | 12/2002 | Bjorklund | F16L 3/24 248/69 |
| 9,417,025 | B1 * | 8/2016 | McDonald | F41A 23/02 |
| 9,809,430 | B2 * | 11/2017 | Wescott | A62B 35/0037 |

* cited by examiner

*Primary Examiner* — Adriana Figueroa
(74) *Attorney, Agent, or Firm* — Blank Rome LLP

(57) ABSTRACT

A device may include an anchor point operationally connected to a rebar, an E-clamp coupled to the anchor point, and a forcing handle configured to tighten the E-clamp to the rebar.

5 Claims, 3 Drawing Sheets

REBAR BITER

FIELD

The present application relates to safety devices and safety mechanisms.

BACKGROUND

There is a need for improvement of safety devices and safety mechanisms. Safety in a workplace or work environment is usually measured by the quality of the work equipment used to perform work activities. Accordingly, improvements in the field in support of such development and design are desired.

SUMMARY

The techniques described herein may be implemented in and/or used with a number of different types of devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF DRAWINGS

A better understanding of the present subject matter may be obtained when the following detailed description of various aspects is considered in conjunction with the following drawings.

Figure 1:
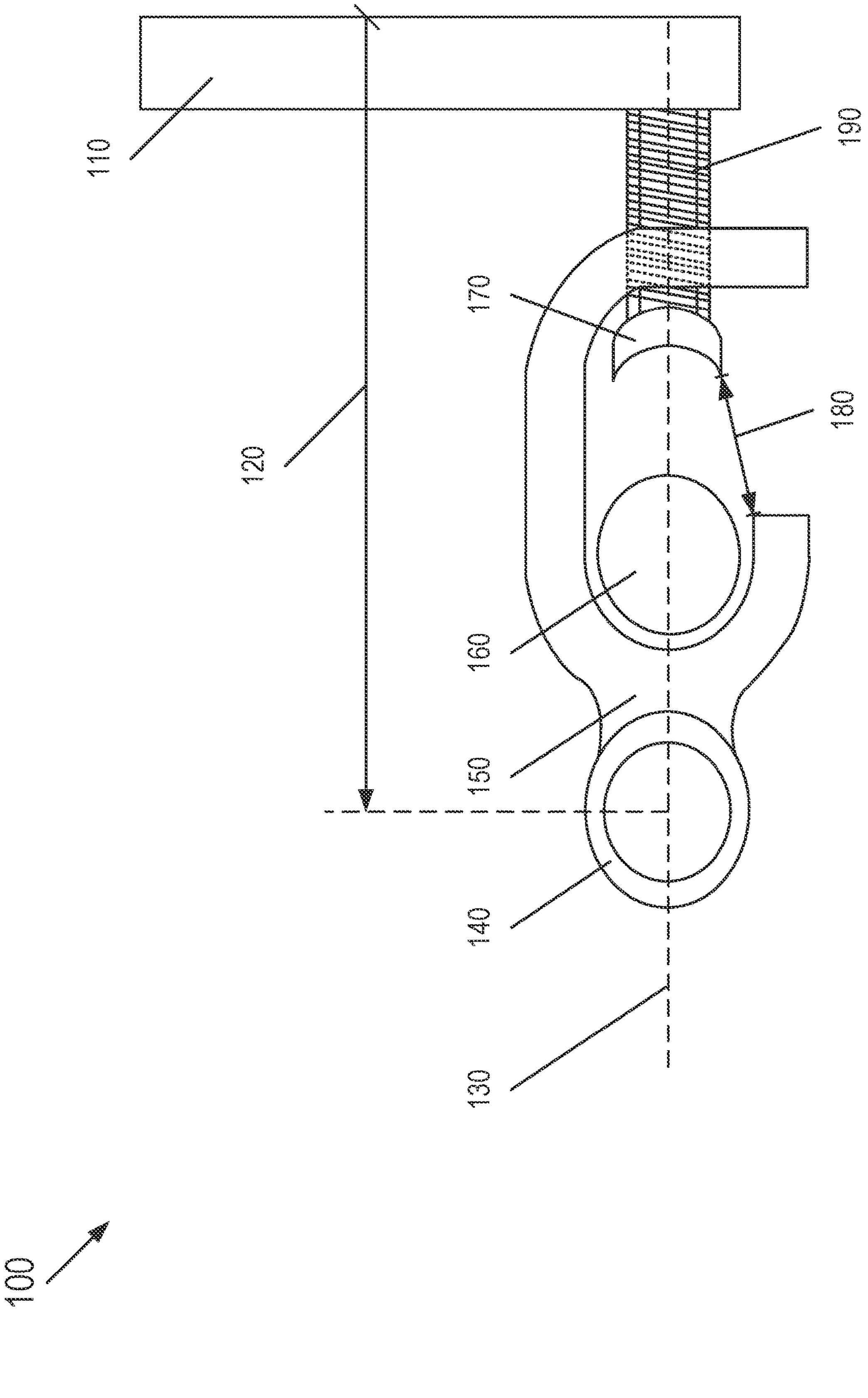
FIG. 1 illustrates a birds-eye view of a rebar biter, according to some aspects.

While the features described herein may be susceptible to various modifications and alternative forms, specific aspects thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

There is a need to enhance safety devices and safety mechanisms. In one or more embodiments discussed herein, this disclosure is directed towards construction fall arrest devices. Within an introductory phase of the project life cycle, a contractor (i.e., a user) may use this affordable equipment to protect themselves from exposed edges greater than six feet. In some embodiments, the rebar biter prevents the contractor from falling while saving their life. The lack of reliable fall protection mechanisms may prevent the contractor from reaching an area where there is a fall hazard, or a personal fall arrest system to allow the worker to work. In one or more embodiments, the rebar biter may prevent falls for heights greater than six feet. This personal fall arrest system may prevent a contractor from falling from a flat work environment. As it will be described in more detail below, the rebar biter includes an anchorage, and a connector. In some embodiment, the connector may be coupled to a lanyard, a deceleration device, a lifeline, or a suitable combination of these.

In one or more embodiments, the rebar biter resists shear force by tying off the contractor to a rebar. Once a concrete floor is poured after a rebar membrane is constructed, the concrete may pass a known pounds per square inch test by concrete testers. This process reassures the contractor and construction managers that the work environment is constructed in accordance with existing safety requirements (i.e., Occupational Safety and Health Administration (OSHA) work site requirements). The combined rebar membrane and the pounds per inch concrete may be used to support and provide the contractor with supported protection against shear forces of falling (i.e., in the case of a fall). In some embodiments, the rebar biter includes an outer anchor point that may provide the contractor with 360 degrees of movement.

In this disclosure, a rebar biter is shown as an enhanced safety device. The rebar biter is a cutting-edge device that enables a person to connect rebar to one or more structural elements. The device may comprise an anchor point, a forcing handle, a U-bolt, and an E-clamp. In some embodiments, the anchor point allows a personal fall arrest to be connected to the rebar biter, making a work environment (i.e., a work site such as a construction site) significantly safer by providing additional layers of support in the event of a pull. The forcing handle may be turned both clockwise and counterclockwise, enabling connection and disconnection to the rebar. The U-bolt may hold the device in place. The E-clamp may be designed to provide a freedom of movement around a work environment.

In one or more embodiments, the small footprint of the rebar biter allows ease of movement around the work environment. In some embodiments, the anchor point is welded onto the e-clamp. The anchor point may allow an individual using the rebar biter to connect a personal fall arrest system onto the rebar. The E-clamp may comprise an opening that the rebar is inserted into. The E-clamp provides the rebar biter with a fall protection mechanism for the beginning of construction up to topping off of a building when all the rebar is encapsulated in concrete. The U-bolt may be connected to threads which may be connected to a forcing handle. Turning the forcing handle clockwise may cause the rebar biter and the U-bolt to be tightened onto the rebar. Turning the elongated forcing handle counterclockwise will loosen the device off the rebar.

In accordance with one or more embodiments, the rebar biter provides a cost-effective device that the contractor may use to effectively protect themselves from unprotected edges during introductory phases of a construction in a work environment. The E-shaped, mechanical, rebar biter goes over the rebar, and locks, turning the device clockwise onto the rebar. The rebar biter anchors onto the rebar to prevent the individual from falling from the adverse conditions on the construction site (i.e., the contractor is higher than six feet and the edge of the structure is unprotected). The contractor can connect any fall arrest device onto the rebar biter to provide them with this ultimate protection. To release the rebar biter from the rebar, the contractor may turn the forcing handle of the device counterclockwise (i.e., the contractor may put themselves within an uncompromisable situation to prevent them from falling). The rebar biter may support 5000 pounds (lbs), which may include a gross weight of individual tools and shear forces of falling if necessary.

The Rebar Biter Meets OSHA's Fall Protection Safety and Health Regulations for Construction A Personal Fall Arrest Systems (PFAS) is a system with components that may work together to protect contractors when they fall from elevated heights. The PFAS components include anchorage, connectors, and a full-body harness, and may include a shock-absorbing lanyard, a retractable lifeline, and/or a deceleration device (see 29 CFR 1926.500(b)).

The PFAS components may be marked by their manufacturer with pertinent information specific to the equipment, such as warnings, serial/model number, capacity, and the materials used to make the component. Information (e.g., proper use, maintenance, inspection) about fall protection components may be provided in equipment manuals.

Although some components may look the same, they may not be interchangeable if they are from different manufacturers or from different equipment series made by the same manufacturer.

Personal fall protection system effectiveness may rely on component compatibility. In some embodiments, components are supplied together as a set. Using non-compatible fittings may lead to damage and system failure (see 29 CFR 1926.502(d)(5)).

A compatibility assessment may be performed when using fittings from different manufacturers or different product lines from the same manufacturer. This includes assessing the way fittings connect to each other and confirming with the manufacturer(s) that the fittings can be used together safely.

Anchorage-anchorage systems may include, at a minimum, a building structure and an anchorage device to which the worker will tie off Anchors may be fixed to a strong structural member. Anchors may not be effective if they are attached to weak materials. Certain structural members may not be strong enough to hold the sudden weight imposed by a falling worker. The anchorage manufacturer may provide instructions on anchor installation (see 29 CFR 1926.502 (d)(15); 29 CFR 1926.1423(g)). Many anchors may be removed when they are no longer needed. Other anchors may be designed to be left in place for future use (e.g., repeated servicing), or may be covered over during the job (e.g., with roofing shingles), or may be cut flush with the surrounding surface (e.g., concrete bolt-style anchor protruding from a wall).

A lanyard may be a flexible rope, wire rope, or strap which generally has a connector at each end for connecting the body belt or body harness to a deceleration device, lifeline, or anchorage point (see 29 CFR 1926.500(b)). Some manufacturers may offer adjustable length lanyards. Effective lanyards may be maintained in a clean, intact condition, and inspected prior to each use for wear, tear, and any obvious distortion or signs that the fall arrest (energy-absorbing) system has been activated (see 29 CFR 1926.502 (d)(21)). Inspecting a lanyard may involve beginning at one end and continuing to the opposite end. During an inspection, the lanyard may be slowly rotated so that its entire circumference is checked.

A deceleration device may be a mechanism (e.g., tearing or deforming lanyards) that serves to dissipate energy during a fall to limit the energy and stress imposed on a worker during a fall. Deceleration occurs over a maximum distance of 3.5 feet (see 29 CFR 1926.502(d)(16)(iv)). Deceleration devices vary widely. Examples include self-retracting lanyards, rip-stitch lanyards, shock-absorbing lanyards, and/or vertical and horizontal lifelines.

A self-retracting lanyard/lifeline may include a drum-wound line which may be slowly extracted or retracted. The lanyard may extend as necessary to allow the worker to move about the work area, but may retract as necessary to maintain slight tension, preventing the line from becoming slack. The drum may be under slight tension during normal worker movement and automatically locks the drum when the line is extracted too rapidly (see 29 CFR 1926.500(b)).

Self-retracting lanyards and lifelines that limit free fall to two feet or less may need to sustain, at a minimum, 3,000 pounds applied to the device with the lanyard in the fully extended position (see 29 CFR 1926.502(d)(12)).

Self-retracting lanyards that do not limit free fall to two feet or less may need to sustain, at a minimum, 5,000 pounds applied to the device with the lanyard in the fully extended position (see 29 CFR 1926.502(d)(13)).

Some retractable lifelines may provide a deceleration (energy-absorbing) function. These lifelines may include a feature that slows the fall over a distance of up to 3.5 feet (see 29 CFR 1926.502(d)(16)(iv)).

A rip-stitch lanyard may have extra webbing incorporated into the lanyard. The extra webbing is stitched into place and folded lengthwise along the lanyard. During a fall, the weaker stitching allows the folded webbing to pull away at a controlled speed, slowing the fall.

The webbing in a shock-absorbing lanyard may be designed to stretch as it receives the worker's falling weight. The stretching action may break the fall in a controlled manner.

A lifeline may be a component consisting of a flexible line for connection to an anchorage at one end to hang vertically (i.e., vertical lifeline) or for connection to anchorages at both ends to stretch horizontally (i.e., horizontal lifeline), and which serves as a means for connecting other components of a PFAS to the anchorage (see 29 CFR 1926.500(b)). Vertical lifelines may remain connected to a set anchorage point while the lanyard moves with the worker. If the contractor falls, the clip locks (i.e., cable grab) to the lifeline and stops the worker from falling further. When vertical lifelines are used, each worker may need to be attached to a separate lifeline (see 29 CFR 1926.502(d)(10)).

Horizontal lifelines may require special attention during design and installation to: (1) limit the distance the worker can fall (a greater sag in the line can mean a farther fall); and (2) minimize the forces on the connectors at the anchorage (a greater sag in the line can mean lower forces on the anchorage connectors at either end).

Depending on their geometry and sag angle, horizontal lifelines may be subjected to greater loads than the impact load imposed by an attached component. When the horizontal lifeline's sag is less than 30 degrees, the impact force imparted to the lifeline by an attached lanyard is greatly amplified. For reference, a 15-degree sag angle amplifies the force approximately 2:1. A 5 degree sag angle amplifies the force approximately 6:1. See 29 CFR 1926 Subpart M, Appendix C for more information.

Harnesses may include shoulder straps and leg straps, a sub-pelvic assembly, adjustable buckles or fasteners, and one or more D-rings to connect to a lanyard. The dorsal D-ring (between the worker's shoulder blades) is used with a fall arrest system. D-rings in other positions are sometimes included for use with ladder safety devices. For this reason, some harnesses come with D-rings on the front, sides, and lower back.

Turning to FIG. 1, a top view of a rebar biter 100 is shown in a connected position. The rebar biter 100 may include an anchor point 140, an E-clamp 150, a U-bolt 170, and a forcing handle 110. The rebar biter 100 may be configured to contain a rebar 160 between the E-clamp 150 and the U-bolt 170. The rebar 160 may be contained by the U-bolt 170 via a rotation of the forcing handle 110. Using multiple threads 190 going through a hole (shown in dotted lines) in the E-clamp, the forcing handle 110 may be rotated clockwise to contain the rebar 160 or counterclockwise to release the rebar 160. The forcing handle 110 may be used for tightening/loosening the E-clamp 150.

In some embodiments, the rebar biter 100 is a clamping device that connects to the rebar 160 that is reinforced with concrete. The rebar biter 100 includes an anchor point 140 for the individual to use as a personal fall arrest system once the rebar biter 100 is properly attached. In FIG. 1, the bird's eye view of the rebar biter 100 includes the E-clamp 150, the forcing handle 110, a sectional view of the rebar 160, the anchor point 140, and the U-bolt 170. Specifically, FIG. 1 shows how all the parts are assembled and connected in relation to the rebar 160.

In some embodiments, when the rebar 160 is massed as reinforcing steel or reinforcement steel, the rebar 160 may be a steel bar or mesh of steel wires used as a tension device in reinforced concrete.

The E-clamp 150 may be structurally (i.e., of a same continuous material) coupled to the anchor point 140 and operationally coupled to the U-bolt 170 via a hole through a surface parallel to the forcing handle 110. The anchor point 140 may meet the PFAS regulation required by OSHA. The anchor point 140 may be used to connect the rebar biter 100 to a harness or a PFAS-compliant harness device of the contractor. A center of the anchor point 140 may be located at a predetermined distance 120 from the forcing handle 110. The predetermined distance 120 may be between 5 inches and 15 inches. In some embodiments, turning the forcing handle 110 in a clockwise direction (not shown) tightens the rebar biter 100 onto the rebar 160. In this case, the contractor may connect the OSHA-compliant PFAS to the anchor point 140 to prevent the contractor from falling. In some embodiments, turning the forcing handle 110 in a counterclockwise direction (not shown) loosens the rebar biter 100 off the rebar 160.

The U-bolt 170 may connect to the rebar 160 by tightening the forcing handle 110. The ridges of the U-bolt 170 may adhere to the rebar 160 thereby preventing the E-clamp 150 from moving (i.e., also referred to as containing the rebar 160).

The rebar biter 100 may be balanced around a center axis 130 that crosses the center of the hole and the U-bolt 170. The U-bolt 170 may be disposed at a retracted distance 180 from an opposite surface of the E-clamp 150 in a disengaged position. Upon rotating the U-bolt 170 by rotating via the threads 190, the U-bolt 170 may be brought against the rebar 160. The retracted distance 180 may be between 1 inch or 5 inches, based on an application design.

The rebar biter 100 may be formed from forged steel or a reinforced metal such as Aluminum 5052-O or ANSI TYPE 304 Stainless Steel.

Figure 2:
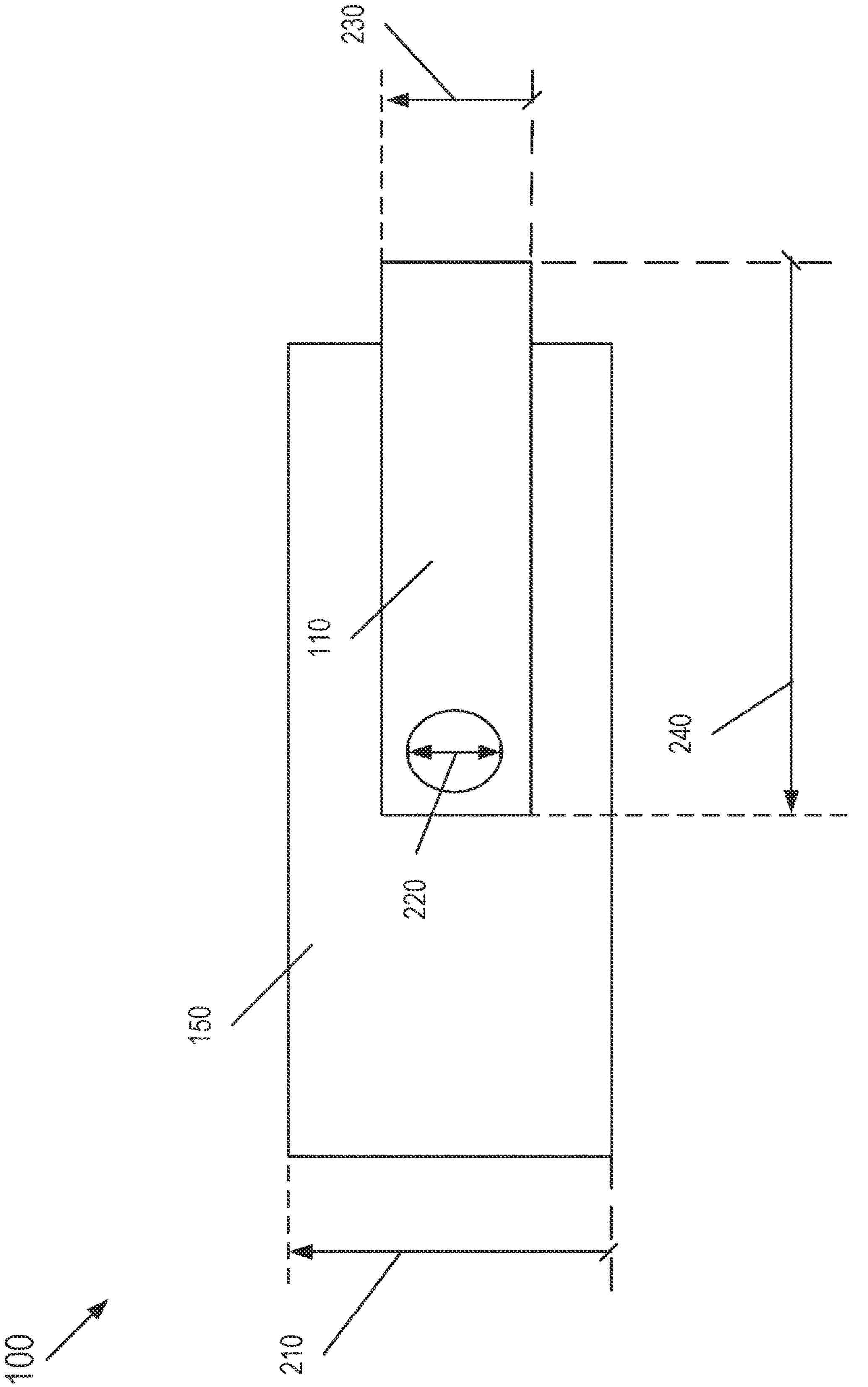
FIG. 2 illustrates a rear view of the rebar biter, according to some aspects.

FIG. 2 shows a diagram illustrating a rear view of the rebar biter 100. In FIG. 2, the rebar biter 100 includes the E-clamp 150 operably connected to the forcing handle 110 via the U-bolt 170 that is threaded using threads 190 through an opening of a diameter 220. In some embodiments, the diameter 220 may be between 0.5 inches and 2 inches. The forcing handle 110 may include a length 240 and a width 230. The length 240 may be a distance that is parallel to the shorter side of the E-clamp 150 while the width 230 may be a distance perpendicular to a plane formed by the shorter side of the E-clamp 150. The length 240 may be between 4 inches and 8 inches. The width 230 may be between 1/16 inches and 1 inch. The E-clamp 150 may include a width 210 parallel to the width 230. The width 210 may be between 0.5 inches and 4 inches.

As described above, the rebar biter 100 may be a fall protection device that provides a potential anchor point for the contractor to attach a harness. The rebar biter 100 may be lightweight and durable. Advantageously, the rebar biter 100 enables the contractor to start working in an area before traditional equipment would allow by providing an OSHA-compliant fall protection device directly from the rebar 160. As the contractor progresses within the project lifecycle (i.e., working at higher heights in the case of high-rise buildings), the contractor may use the rebar 160 (e.g., on the current floor) that has been tied in by the previous floor to connect and tie off. In this case, if the contractor were to fall, a shear force on the rebar, the tensile strength of the rebar biter 100, and the personal fall arrest system may prevent the contractor from falling.

Figure 3:
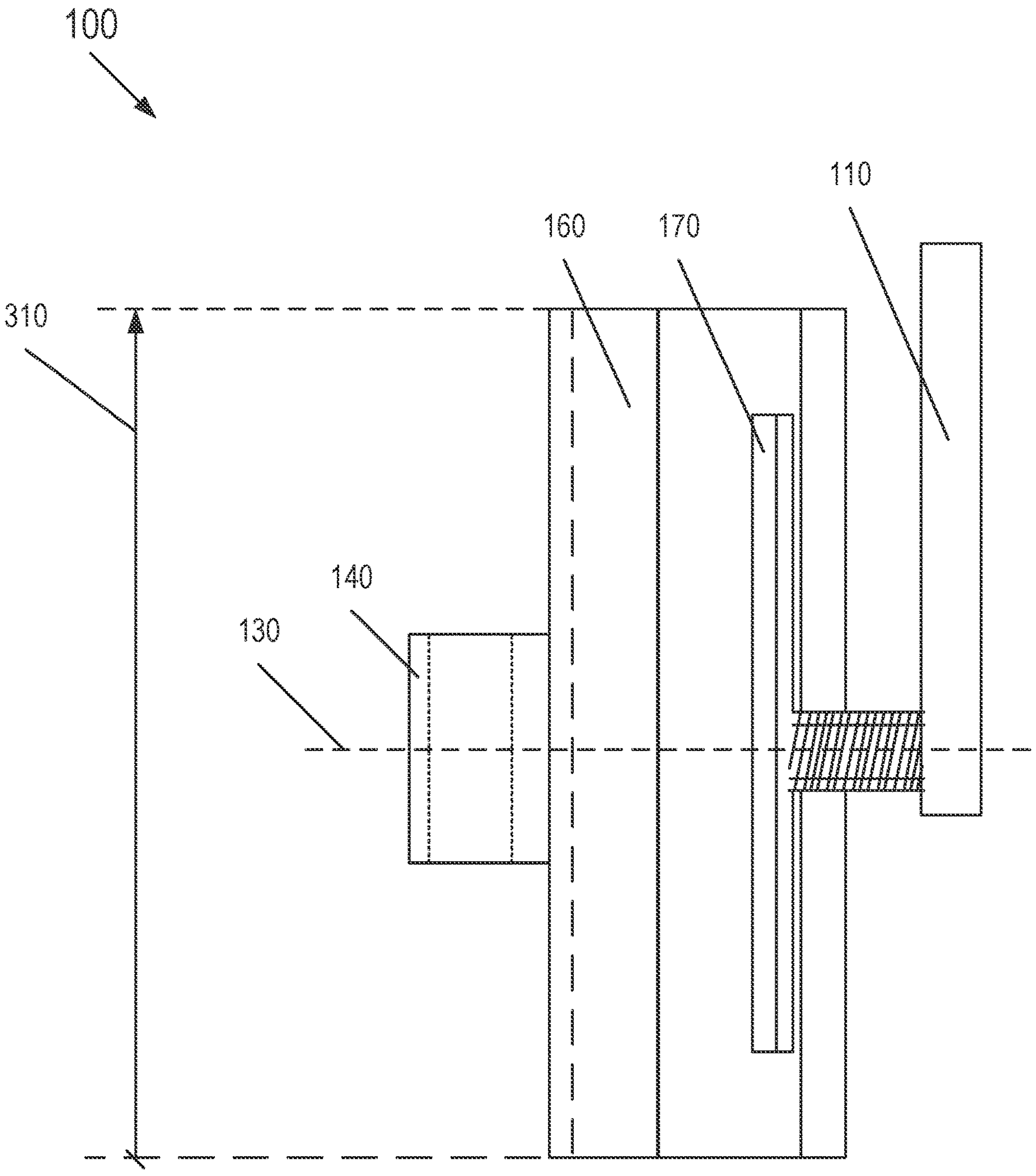
FIG. 3 illustrates a sectional view of the rebar biter, according to some aspects.

Turning to FIG. 3, the rebar biter 100 is shown in a sectional view. This sectional view illustrates a cross-section of the rebar biter 100. In FIG. 3, the rebar biter 100 includes the anchor point 140, the rebar 160, and the U-bolt 170 around the central axis 130. The forcing handle 110 is shown as operably connected to the U-Bolt 170 via the threads 190.

Although the aspects above have been described in considerable detail, numerous variations and modifications will become apparent to those skilled in the art once the above disclosure is fully appreciated. It is intended that the following claims be interpreted to embrace all such variations and modifications.

The invention claimed is:

1. A rebar biter, comprising:
an anchor point,
a forcing handle,
a U-bolt, wherein the U-bolt is configured to adhere to a rebar, and
an E-clamp having a substantially E-shaped frame having first and second opposing arms structurally coupled to the anchor point and operationally coupled to the U-bolt via a hole through a surface of the first opposing arm parallel to the forcing handle,
wherein the forcing handle is configured to tighten the U-bolt to the rebar;
wherein the rebar biter is balanced around a center axis that crosses through the center of the anchor point, the U-bolt, and the rebar; and
wherein the first opposing arm's distal portion is perpendicular to the center axis and the second opposing arm's distal portion is parallel to the center axis.

2. The rebar biter device of claim 1,
wherein the U-bolt is connected to the forcing handle via a plurality of threads, and
wherein the forcing handle is configured to rotate clockwise to tighten the U-bolt to the rebar.

3. The rebar biter of claim 1, wherein the anchor point is welded onto the E-clamp.

4. The rebar biter of claim 1, wherein the anchor point provides a connection to a personal fall arrest system.

5. The rebar biter of claim 1, wherein the E-clamp includes an opening for containing the rebar, the opening being between 1 inch and 2 inches.

* * * * *